United States Patent
Lugo-Castillo et al.

(10) Patent No.: US 12,371,022 B2
(45) Date of Patent: Jul. 29, 2025

(54) OPTIMIZING REGENERATIVE BRAKING

(71) Applicant: Cummins Inc., Columbus, IN (US)

(72) Inventors: Jaime Antonio Lugo-Castillo, Columbus, IN (US); Sathya Narayanan Hariharan, Columbus, IN (US); Yuanchun Cai, Columbus, IN (US); Balan Mariappan Selvaraj, Columbus, IN (US); Richard A. Booth, Columbus, IN (US)

(73) Assignee: Cummins Inc., Columbus, IN (US)

( * ) Notice: Subject to any disclaimer, the term of this patent is extended or adjusted under 35 U.S.C. 154(b) by 158 days.

(21) Appl. No.: 18/112,067

(22) Filed: Feb. 21, 2023

(65) Prior Publication Data
US 2023/0264693 A1    Aug. 24, 2023

Related U.S. Application Data (60) Provisional application No. 63/312,226, filed on Feb. 21, 2022.

(51) Int. Cl.
*B60W 30/18*    (2012.01)
*B60W 10/10*    (2012.01)

(52) U.S. Cl.
CPC ...... *B60W 30/18127* (2013.01); *B60W 10/10* (2013.01); *B60W 2510/1035* (2013.01); *B60W 2520/10* (2013.01); *B60W 2710/105* (2013.01); *B60W 2720/106* (2013.01)

(58) Field of Classification Search
CPC .......... B60W 30/18127; B60W 10/10; B60W 2510/1035; B60W 2520/10; B60W 2710/105; B60W 2720/106; B60L 7/26; B60L 7/18; B60L 7/10; B60L 15/2009; B60L 2240/423
See application file for complete search history.

(56) References Cited

U.S. PATENT DOCUMENTS

| | | | |
|---|---|---|---|
| 8,055,422 B2 | 11/2011 | Yurgil | |
| 9,630,626 B2 | 4/2017 | Johri et al. | |
| 9,908,417 B2 | 3/2018 | Liang et al. | |
| 10,150,371 B2 | 12/2018 | Zenner et al. | |
| 10,267,412 B2 | 4/2019 | Kuang et al. | |
| 11,230,288 B1* | 1/2022 | Tokarz | B60W 20/40 |

(Continued)

FOREIGN PATENT DOCUMENTS

GB    2368827 A    5/2002

*Primary Examiner* — Hunter B Lonsberry
*Assistant Examiner* — Jalal C Coduroglu
(74) *Attorney, Agent, or Firm* — Faegre Drinker Biddle & Reath LLP (57) ABSTRACT

A control system for controlling a powertrain of an electric or hybrid electric vehicle is disclosed. The powertrain comprises a battery and a traction motor and is operable in a regenerative braking mode. The control system is configured to generate a deceleration target for the vehicle in the regenerative braking mode, and to generate a torque command for the traction motor based on the deceleration target. By generating a deceleration target for the vehicle during regenerative braking and using the deceleration target to control the torque of the traction motor, more consistent regenerative braking may be provided, particularly when the vehicle is used to carry different loads.

20 Claims, 7 Drawing Sheets

(56) References Cited

U.S. PATENT DOCUMENTS

| | | | |
|---|---|---|---|
| 2001/0039230 A1* | 11/2001 | Severinsky | F02B 37/18 |
| | | | 180/65.23 |
| 2007/0193802 A1* | 8/2007 | Hu | B60K 28/16 |
| | | | 180/197 |
| 2009/0118936 A1* | 5/2009 | Heap | F02D 41/023 |
| | | | 477/109 |
| 2010/0036575 A1 | 2/2010 | Yurgil | |
| 2011/0246012 A1 | 10/2011 | McClain | |
| 2012/0133202 A1 | 5/2012 | Mui | |
| 2013/0289809 A1* | 10/2013 | Treharne | B60L 3/0046 |
| | | | 180/65.285 |
| 2015/0266383 A1* | 9/2015 | Kidston | B60L 58/12 |
| | | | 701/70 |
| 2018/0093572 A1 | 4/2018 | Hall et al. | |
| 2018/0118034 A1 | 5/2018 | Zenner et al. | |
| 2018/0134276 A1 | 5/2018 | Zhao et al. | |
| 2018/0365990 A1* | 12/2018 | Suzuki | G08G 1/163 |
| 2019/0016345 A1* | 1/2019 | Kitagawa | B60W 30/18163 |
| 2019/0217847 A1 | 7/2019 | Hawley | |
| 2019/0394626 A1* | 12/2019 | Hitotsumatsu | H04W 4/38 |
| 2023/0121191 A1* | 4/2023 | Rust | B60L 7/18 |
| | | | 701/22 |
| 2023/0264693 A1* | 8/2023 | Lugo-Castillo | B60L 7/18 |
| | | | 701/22 |

\* cited by examiner

OPTIMIZING REGENERATIVE BRAKING

CROSS-REFERENCE TO RELATED APPLICATIONS

The present application claims priority to U.S. Provisional Application Ser. No. 63/312,226, entitled "OPTIMIZING REGENERATIVE BRAKING," filed on Feb. 21, 2022, the entire disclosure of which being expressly incorporated herein by reference.

FIELD OF THE DISCLOSURE

The present disclosure relates to techniques for optimizing regenerative braking in electric and hybrid electric vehicles.

BACKGROUND

Electric and hybrid electric vehicles use one or more traction motors powered by a battery to provide motive power. During deceleration, the traction motor may operate in a regenerative braking mode. In this mode, the traction motor operates as a generator to convert the vehicle's kinetic energy into electrical energy to charge the battery and/or power other electrical components. This can allow the recovery of energy which would otherwise be wasted and may help to extend the life of the vehicle's friction brakes.

Typically, the amount of regenerative braking is scheduled as a limit of torque for the entire range of traction motor speeds. However, at different vehicle weights, the same torque may provide different deceleration rates, causing an inconsistent feel to the operator when coasting or unexpected drivability issues with severe loading or unloading of weight upon the vehicle, for example, in terminal tractor applications. This may also lead to less energy recovery being achieved, particularly when the vehicle is loaded.

It would therefore be desirable to provide a control system for an electric or hybrid electric vehicle which can provide more consistent and/or more efficient regenerative braking, particularly in vehicles which may carry different loads.

SUMMARY

According to one aspect of the present disclosure there is provided a control system for controlling a powertrain of an electric or hybrid electric vehicle, the powertrain comprising a battery and a traction motor, the powertrain operable in a regenerative braking mode, wherein the control system is configured to:
  generate a deceleration target for the vehicle in the regenerative braking mode; and
  generate a torque command for the traction motor based on the deceleration target.

The present disclosure may provide the advantage that, by generating a deceleration target for the vehicle during regenerative braking and using the deceleration target to control the torque of the traction motor, more consistent regenerative braking may be provided, particularly when the vehicle is used to carry different loads. Furthermore, the present disclosure may help to maximize energy recovery when the vehicle is loaded, thereby increasing overall efficiency. The present disclosure may also allow closed loop control of the regenerative braking to be achieved in a cost effective manner.

In one embodiment, the control system is configured to receive a signal indicating a driver power demand, and to generate the deceleration target based on the signal indicating the driver power demand. The signal indicating a driver power demand may be, for example, a signal indicating a position of a vehicle accelerator. The vehicle accelerator may be, for example, an accelerator pedal, a manually operated lever, or any other device used by an operator of the vehicle to indicate a desired power demand. The position of the vehicle accelerator may be sensed by an accelerator sensor. This may allow a deceleration target to be set based on the driver's physical demand.

In one embodiment, the control system is configured to receive a signal indicating a speed of the vehicle, and to generate the deceleration target based further on the signal indicating a speed of the vehicle. For example, a higher deceleration target may be set at a higher speed and a lower deceleration target may be set at a lower speed. The signal indicating a speed of the vehicle may be sensed by a speed sensor. This can allow the speed of the vehicle to be taken into account when setting the deceleration target, which may help the control system to control the vehicle according to driver expectations.

If desired, the deceleration target may also be set based further on one or more other parameter. For example, the control system may be configured to generate the deceleration target based further on one or more of: whether a trailer is present; type of trailer; weight of trailer; type of load; weight of load; weight of vehicle; driver input; or any other appropriate parameter.

In one embodiment, the control system is configured to control the vehicle's deceleration using closed loop acceleration control, that is, by receiving a feedback signal indicating vehicle acceleration. For example, the control system may be configured to compare the deceleration target to a signal indicating an acceleration of the vehicle to produce an acceleration error signal, and to generate the torque command based on the acceleration error signal. This may allow a feedback loop to be provided to control the vehicle's deceleration more accurately than would otherwise be the case.

The control system may be configured to receive a speed signal indicating a speed of the vehicle and to differentiate the speed signal (with respect to time) to obtain the signal indicating an acceleration of the vehicle. The signal indicating a speed of the vehicle may be sensed by a speed sensor. This may allow the signal indicating an acceleration of the vehicle to be produced using an existing speed signal. However, if desired, other techniques for obtaining the acceleration, such as an accelerometer, camera or radar, may be used instead or as well.

In one embodiment, the control system is configured to generate a braking torque demand signal which is used to generate the torque command. For example, the control system may be configured to generate a braking torque demand signal based on the acceleration error signal, and to generate the torque command based on the braking torque demand signal.

The control system may be configured to output the torque command to the traction motor. This can allow the traction motor to apply a braking torque to meet the deceleration target.

In one embodiment, the control system is configured to control the torque of the traction motor using open loop torque control, that is, without receiving a feedback signal indicating traction motor torque. However, the control system may control the vehicle's deceleration using closed loop acceleration control. This may allow control of the regenerative braking to be achieved without the need for a torque sensor and associated closed loop torque control circuitry. Typically, a speed signal is already available, from which the vehicle's acceleration may be obtained, whereas use of a torque sensor and closed loop torque control may add additional cost and complexity. Therefore, this may allow control of the vehicle's regenerative braking to be achieved in a less complex and/or more cost-effective manner.

In one embodiment, the control system is configured to determine whether regenerative braking is required, and to operate the powertrain in the regenerative braking mode if it is determined that regenerative braking is required. For example, the control system may be configured to receive a signal indicating a driver power demand, to generate a torque demand signal in response to the signal indicating the driver power demand, and to determine whether regenerative braking is required in dependence on the torque demand signal. The driver power demand may be obtained, for example, by sensing a position of an accelerator. The control system may determine that regenerative braking is required, for example, if the torque demand signal is negative (indicating that negative torque is required).

The control system may operate the powertrain in a normal driving mode if it is determined that regenerative braking is not required. The control system may be configured to generate the torque command based on the torque demand signal when the powertrain is in the normal driving mode (not in regenerative braking mode). Thus, the torque command may be generated based on the torque demand in normal driving mode and based on the deceleration target in regenerative braking mode.

According to another aspect of the disclosure there is provided a powertrain system for an electric or hybrid electric vehicle, the powertrain system comprising a battery, a traction motor and a control system, wherein the powertrain system is operable in a regenerative braking mode, and wherein the control system is configured to:
   generate a deceleration target for the vehicle when in the regenerative braking mode; and
   generate a torque command for the traction motor based on the deceleration target.

The powertrain system may further comprise a traction motor controller configured to control the traction motor based on the torque command. The traction motor controller may comprise, for example, an inverter and an inverter controller. The powertrain system may be configured such that, when in the regenerative braking mode, the torque command causes the traction motor to apply a braking torque to meet the deceleration target.

The powertrain system may further comprise an accelerator position sensor configured to sense a position of a vehicle accelerator. In this case, the control system may be configured to generate the deceleration target based on a sensed position of the vehicle accelerator.

The powertrain system may further comprise a speed sensor configured to sense a speed of the vehicle. In this case, the control system may be configured to generate the deceleration target based further on a sensed speed of the vehicle.

The control system may be configured to differentiate the speed signal (with respect to time) to obtain a signal indicating an acceleration of the vehicle, to compare the deceleration target to the signal indicating an acceleration of the vehicle to produce an acceleration error signal, and to generate the torque command based on the acceleration error signal. This may allow the control system to control the regenerative braking using an existing speed signal and/or without requiring closed loop torque control.

According to another aspect of the disclosure there is provided a control system for controlling a powertrain of an electric or hybrid electric vehicle, the powertrain comprising a battery and a traction motor, the powertrain operable in a regenerative braking mode, wherein the control system comprises:
   a deceleration target generator configured to generate a deceleration target in the regenerative braking mode;
   a braking torque demand unit configured to generate a torque demand to meet the deceleration target; and
   a torque control unit configured to generate a torque command for the traction motor based on the torque demand.

According to another aspect of the disclosure there is provided a control system for controlling a powertrain of an electric or hybrid electric vehicle, the powertrain comprising a battery and a traction motor, the powertrain operable in a regenerative braking mode, wherein the control system comprises:
   means for generating a deceleration target in the regenerative braking mode; and
   means for generating a torque command for the traction motor based on the deceleration target.

Corresponding methods may also be provided. Thus, according to another aspect of the disclosure there is provided a method of controlling a powertrain of an electric or hybrid electric vehicle, the powertrain comprising a battery and a traction motor, the method comprising:
   operating the powertrain in a regenerative braking mode;
   generating a deceleration target for the vehicle in the regenerative braking mode; and
   generating a torque command for the traction motor based on the deceleration target.

The method may further comprise:
   sensing a position of an accelerator;
   generating a torque demand value in response to the sensed accelerator position;
   determining whether the torque demand value indicates that regenerative braking is required;
   operating the powertrain in the regenerative braking mode when it is determined that regenerative braking is required; and
   generating a torque command for the traction motor based on the torque demand value when it is determined that regenerative braking is not required.

Features of one aspect of the disclosure may be used with any other aspect. Any of the apparatus features may be provided as method features and vice versa.

BRIEF DESCRIPTION OF THE DRAWINGS

Preferred features of the present disclosure will now be described, purely by way of example, with reference to the accompanying drawings, in which.

DETAILED DESCRIPTION OF EMBODIMENTS OF THE DISCLOSURE

Figure 1:
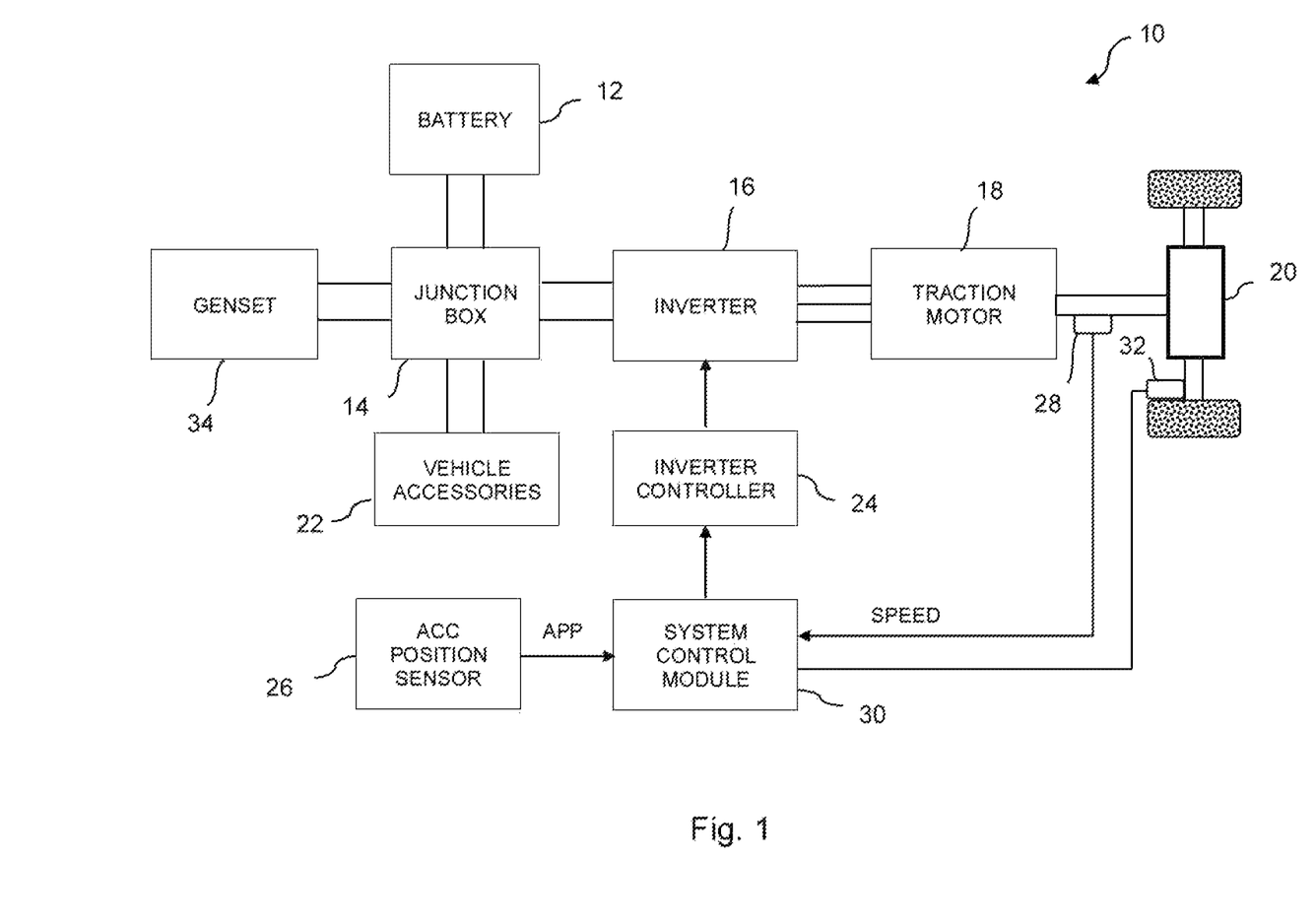
FIG. 1 shows parts of an exemplary powertrain system for an electric vehicle.

FIG. 1 shows parts of an exemplary powertrain system for an electric vehicle. Referring to FIG. 1, the powertrain system 10 comprises battery 12, junction box 14, inverter 16, traction motor 18, vehicle drivetrain 20, electrical accessories 22, inverter controller 24, accelerator pedal position sensor 26, speed sensor 28 and system control module 30. The battery 12 is electrically connected to the junction box 14. The junction box 14 is also electrically connected to the inverter 16 and electrical accessories 22. The junction box 14 is configured to provide a DC bus between the battery 12, the inverter 16 and the electrical accessories 22. The inverter 16 is configured to convert a DC voltage on the DC bus to AC to drive the traction motor 18. The traction motor 18 is mechanically connected to the vehicle drivetrain 20 and is used to propel the vehicle. The traction motor 18 may be, for example, a permanent magnet motor, although other types of electrical machine could be used instead. The traction motor 18 may also operate as a generator and may use regenerative braking to convert mechanical power from the drivetrain 20 to electrical power to provide power to the components on DC bus, such as the battery 12. In this case, the inverter 16 may be used to convert an AC output of the traction motor 18 (when operating as a generator) to DC for supply to the battery 12 via the junction box 14. The vehicle drivetrain 20 typically comprises a drive shaft and a differential connected to driven wheels, in a manner known in the art. The electrical accessories 22 may comprise components such as a heater, power steering inverter, compressor, fan, DC-to-DC converter, etc. The powertrain system may also include friction brakes 32 for when the regenerative braking is insufficient or not available.

In the arrangement shown in FIG. 1, the powertrain system includes an optional generator set (genset) 34 for charging the battery 12 and/or supplying power to other powertrain components. In this configuration, the powertrain is for a series hybrid electric vehicle (also referred to as an extended-range electric vehicle (EREV) or range-extended electric vehicle (REEV)). However, other powertrain configurations such as parallel hybrid, series/parallel hybrid, fuel cell, pure electric, or any other type of powertrain with a traction motor, may be used instead.

In operation, the traction motor 18 is used to supply mechanical power to the vehicle drivetrain 20. Electrical power for the traction motor 18 is supplied from the battery 12 via the junction box 14 and the inverter 16. The inverter 16 is controlled by the inverter controller 24. The accelerator pedal position sensor 26 senses the position of the vehicle's accelerator pedal and provides an accelerator pedal position (APP) signal to the system control module 30. The speed sensor 28 senses the speed of the traction motor 18 and provides the sensed speed to the system control module 30. The system control module 30 calculates control signals for the inverter controller 24 to meet the driver demand power (indicated by the accelerator pedal position) within system capability. The traction motor 18 may also operate in regenerative braking mode in which the vehicle's momentum is used to recover electrical energy to provide energy to the battery 12 or other components on DC bus. The battery 12 may also be charged from an external power source such as a charging station or the electrical grid. The battery 12 includes a battery management system which is used to monitor and manage charge and discharge of the battery.

When the powertrain is in regenerative braking mode, the system control module 30 outputs a control signal for the inverter controller 24 which causes the traction motor 18 to apply negative torque to slow the vehicle. In this case, the traction motor operates as a generator to convert the vehicle's kinetic energy into electrical energy for charging the battery 12. The amount of regenerative braking is based on the accelerator pedal position.

In existing powertrain control systems, a limit is typically placed on the amount of negative torque which can be applied during regenerative braking. The torque limit is typically applied for the entire range of traction motor speeds. By setting a torque limit during regenerative braking, overly aggressive deceleration can be avoided.

However, it has been found that, when the vehicle is carrying different weights, the same negative torque may provide different deceleration rates. This may lead to an inconsistent feel to the operator when coasting or decelerating. Furthermore, unexpected drivability issues may arise with severe loading or unloading of weight on the vehicle, which may occur in terminal tractor applications.

In embodiments of the present disclosure, instead of controlling the amount of regenerative braking based on torque, a deceleration target is set. The deceleration target is converted into an acceleration demand and, using the existing torque control system (open loop or closed loop), the necessary torque to meet the deceleration target is applied. This allows for more consistent feel in drivability while maximizing energy recovery when the vehicle is loaded.

Figure 2:
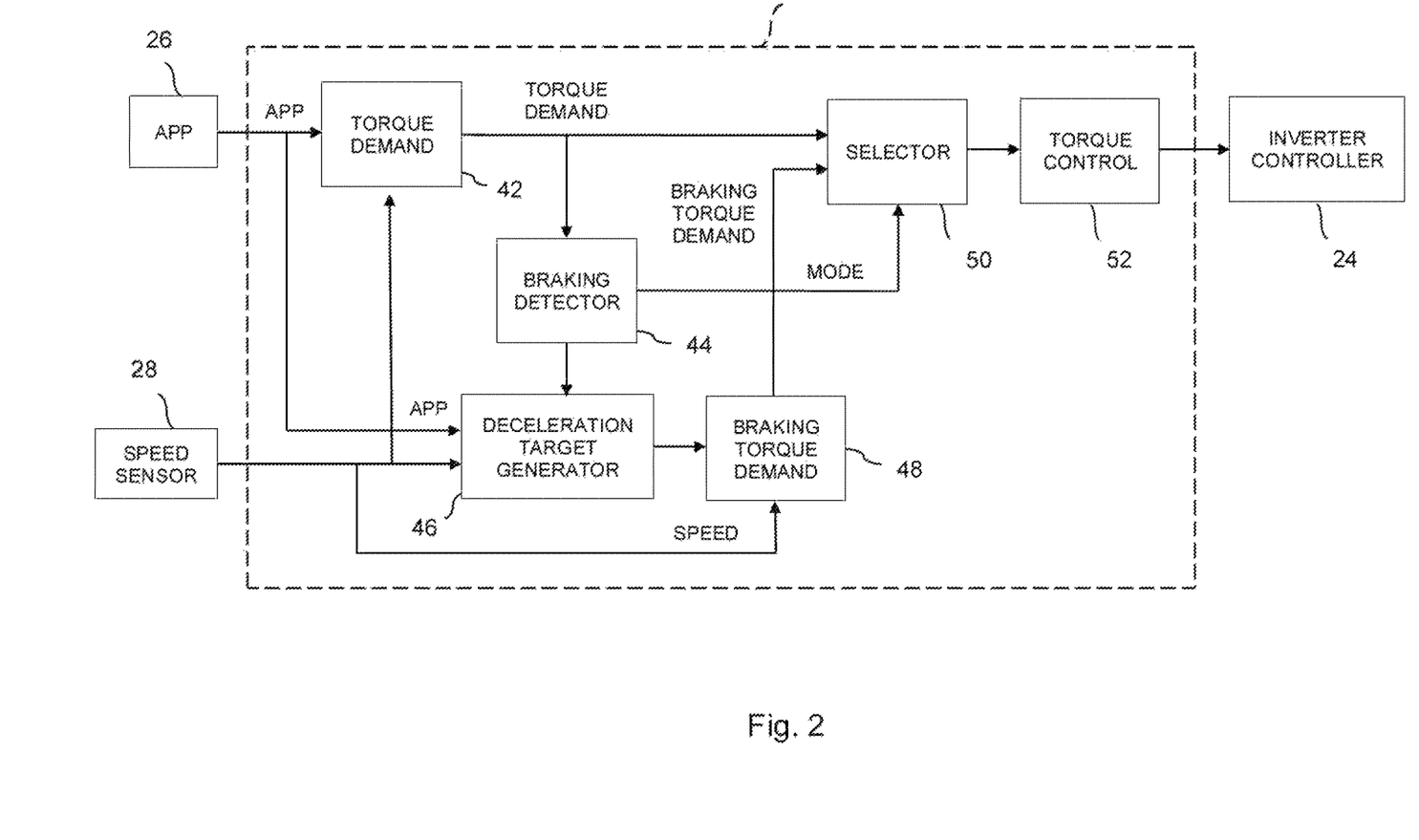
FIG. 2 shows parts of a system control module in one embodiment of the disclosure.

FIG. 2 shows parts of a system control module in an embodiment of the present disclosure. The system control module may be used with an electric or hybrid electric vehicle such as that shown in FIG. 1. Referring to FIG. 2, the system control module 40 comprises torque demand calculation unit 42, braking detector 44, deceleration target generator 46, braking torque demand calculation unit 48, selector 50 and torque control unit 52. The system control module 40 may be implemented as a processor executing the appropriate software, along with memory and other components, and/or as hardware or firmware. The system control module 40 receives an accelerator pedal position (APP) signal from the accelerator pedal position sensor 26 and a speed signal from the speed sensor 28, and outputs a control signal to the inverter controller 24. The acceleration pedal position sensor 26, speed sensor 28 and inverter controller 24 may be, for example, as described above with reference to FIG. 1.

In operation, the torque demand calculation unit 42 receives the accelerator pedal position signal from the accelerator pedal position sensor 26. The torque demand calculation unit 42 calculates the torque that would meet the driver demand based on the accelerator pedal position signal (and optionally other signals not shown in FIG. 2). For example, a maximum positive torque demand may be produced when the accelerator pedal is fully depressed, and a maximum negative torque demand may be produced when the accelerator pedal is fully released. The torque demand may vary progressively between these two values as the position of the accelerator pedal varies. The torque demand may also be calculated based on the vehicle speed as measured by the speed sensor 28. In this case, a higher magnitude torque demand may be generated at higher speeds. If a brake pedal is provided, the torque demand may also be based on the brake pedal position. The torque demand is output to the braking detector 44 and the selector 50.

The braking detector 44 detects whether the vehicle is in a regenerative braking mode based on the torque demand. This may be achieved by determining whether the torque demand is negative, indicating that the traction motor is to operate as a generator. In this case, the braking detector detects that the vehicle is in regenerative braking mode when the torque demand is negative, and that the vehicle is in normal driving mode when the torque demand is positive or zero. The braking detector 44 outputs a mode signal indicating whether the vehicle is in regenerative braking mode or normal driving mode to the deceleration target generator 46 and the selector 50.

When the braking detector 44 detects that the vehicle is in regenerative braking mode, the deceleration target generator 46 generates a deceleration target for the regenerative braking. The deceleration target may be set based on the sensed accelerator pedal position. This may be achieved, for example, using a formula or a lookup table which maps accelerator pedal position to deceleration target. Generally, the deceleration target will increase progressively as the force on the accelerator pedal decreases. The deceleration target may also be set based on vehicle speed, with a higher deceleration target being set at higher speeds. For example, in one embodiment, the deceleration target may be between $-0.1$ and $-0.5$ m/s$^2$ depending on accelerator pedal position for speeds of up to 10 kph; between $-0.1$ and $-0.7$ m/s$^2$ depending on accelerator pedal position for speeds of 10 to 20 kph; between $-0.1$ and $-1.0$ m/s$^2$ depending on accelerator pedal position for speeds of 20 to 30 kph; and between $-0.1$ and $-1.3$ m/s$^2$ depending on accelerator pedal position for speeds above 30 kph. However, it will be appreciated that these values are given by way of example only, and different values may be used as appropriate. If a brake pedal is provided, the deceleration target may also be based on the brake pedal position. The deceleration target is output to the braking torque demand calculation unit 48.

The braking torque demand calculation unit 48 calculates a braking torque demand based on the deceleration target. The braking torque demand is a value representing the torque which would be required to meet the deceleration target. The braking torque demand is output to the selector 50.

The selector 50 selects one of the torque demand produced by the torque demand calculation unit 42, and the braking torque demand produced by the braking torque demand calculation unit 48, in dependence on the mode signal from the braking detector 44. When the mode signal indicates that the vehicle is in normal driving mode, the selector 50 selects the torque demand produced by the torque demand calculation unit 42. When the mode signal indicates that the vehicle is in regenerative braking mode, the selector 50 selects the braking torque demand produced by the braking torque demand calculation unit 48. The selected torque demand is fed to the torque control unit 52.

The torque control unit 52 produces a torque control signal based on the selected torque demand. The torque control signal is output to the inverter controller 24. The torque control signal instructs the inverter controller to control the traction motor 18 to meet the torque demand. In this embodiment, open loop torque control is used, although closed loop torque control could be used instead. The torque control unit 52 may also send a command signal to the friction brakes 32 to apply a braking torque, if regenerative braking is insufficient or not available.

Figure 3:
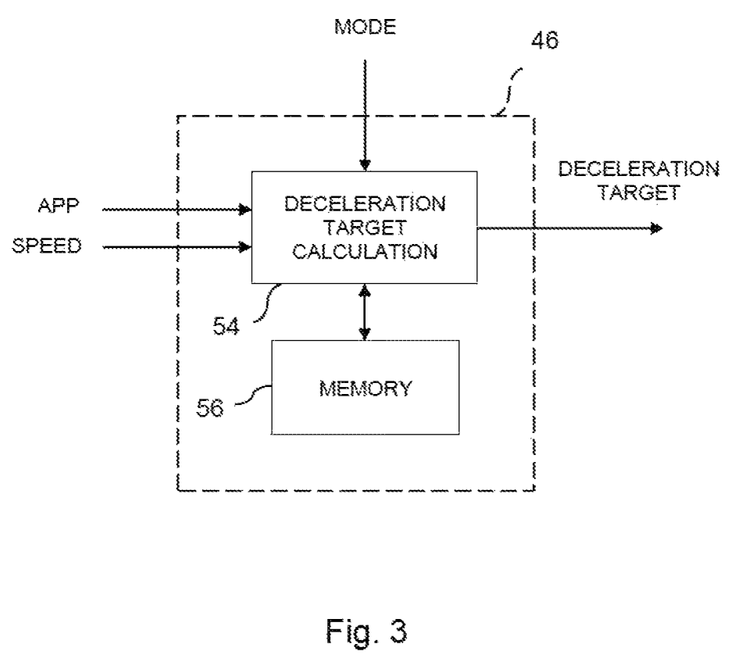
FIG. 3 shows parts of a deceleration target generator in one embodiment of the disclosure.

FIG. 3 shows parts of the deceleration target generator 46 in more detail. Referring to FIG. 3, the deceleration target generator 46 comprises deceleration target calculation unit 54 and memory 56. In operation, the deceleration target calculation unit 54 receives a mode signal from the braking detector 44, an accelerator pedal position (APP) signal from the acceleration pedal position sensor 26 and a speed signal from the speed sensor 28. When the mode signal indicates that the vehicle is in regenerative braking mode, the deceleration target calculation unit 54 uses the accelerator pedal position signal and the speed signal to obtain a deceleration target from a lookup table stored in the memory 56. In this embodiment, the lookup table is a two-dimensional array which maps accelerator pedal position and speed to deceleration target. The values in the array are predetermined values which are calculated in advance to achieve the desired regenerative braking performance. However, if desired, the values in the array could be modified or updated, for example, to achieve a different performance or based on driver input. Furthermore, rather than using a lookup table, it would be possible to use a formula such as a polynomial function or any other appropriate type of function to obtain the deceleration target from accelerator pedal position and speed.

Figure 4:
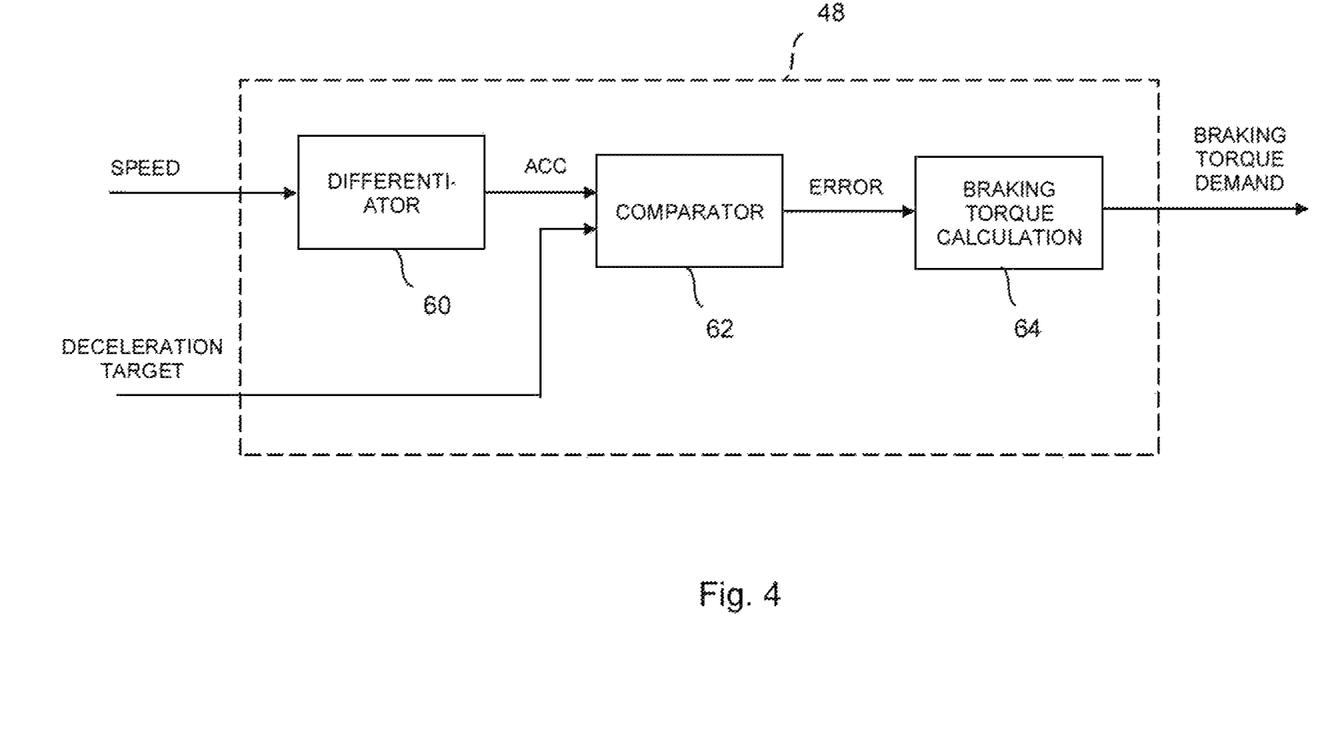
FIG. 4 shows parts of a braking torque demand calculation unit.

FIG. 4 shows parts of the braking torque demand calculation unit 48 in more detail. Referring to FIG. 4, the braking torque demand calculation unit 48 comprises differentiator 60, comparator 62, and braking torque calculation unit 64. In operation, the differentiator 60 receives the speed signal from the speed sensor 28 and differentiates the speed signal with respect to time. The output of the differentiator 60 is an acceleration signal indicating the current acceleration of the vehicle. It will be appreciated that the acceleration signal may be obtained in other ways, such as by directly measuring the vehicle's acceleration. For example, the acceleration could be measured using an accelerometer. Alternatively, a camera or radar could be used to measure speed, and the measured speed differentiated with respect to time to obtain the acceleration signal. The acceleration signal may be positive or negative or zero, with a positive value indicating that the vehicle is accelerating and a negative value indicating that the vehicle is decelerating. The acceleration signal is fed to the comparator 62.

The comparator 62 compares the acceleration target with the acceleration signal. The output of the comparator 62 is an acceleration error signal indicating a difference between the actual vehicle deceleration and the deceleration target. The acceleration error signal is fed to the braking torque calculation unit 64.

The braking torque calculation unit 64 calculates the braking torque demand value based on the acceleration error signal. This may be achieved, for example, using a formula or a lookup table which maps the acceleration error signal to torque demand. Generally, the magnitude of the braking torque demand will increase progressively as the acceleration error signal increases. The output of the braking torque calculation unit 64 is the braking torque demand value which is fed to the selector 50 of FIG. 2.

By producing a deceleration target during regenerative braking, and using the deceleration target to generate a torque command in the way described above, a more consistent feel in drivability may be achieved while maximizing energy recovery while the vehicle is braking, without requiring driver input.

As an example, when the vehicle is light in weight, less regenerative torque is needed to meet a deceleration target of 0.7 m/s$^2$ whereas considerably more regenerative torque is needed to bring the same vehicle, at full payload, to the same deceleration rate.

Furthermore, by providing closed loop control of the vehicle's deceleration in the way described above, the regenerative braking can be controlled using an existing speed sensor, without the need to provide a torque sensor or closed loop torque control. A torque sensor and torque control loop may be relatively expensive or complex to implement, and thus the presently disclosed arrangement may allow effective control of the regenerative braking to be achieved in a less complex and/or more cost-effective manner.

However, if desired, the torque control unit 52 could use closed loop torque control. In this case, a torque sensor is provided, and the sensed torque is compared to the torque demand to produce a torque error signal which is used to generate the torque command, in a manner known in the art.

Figure 5:
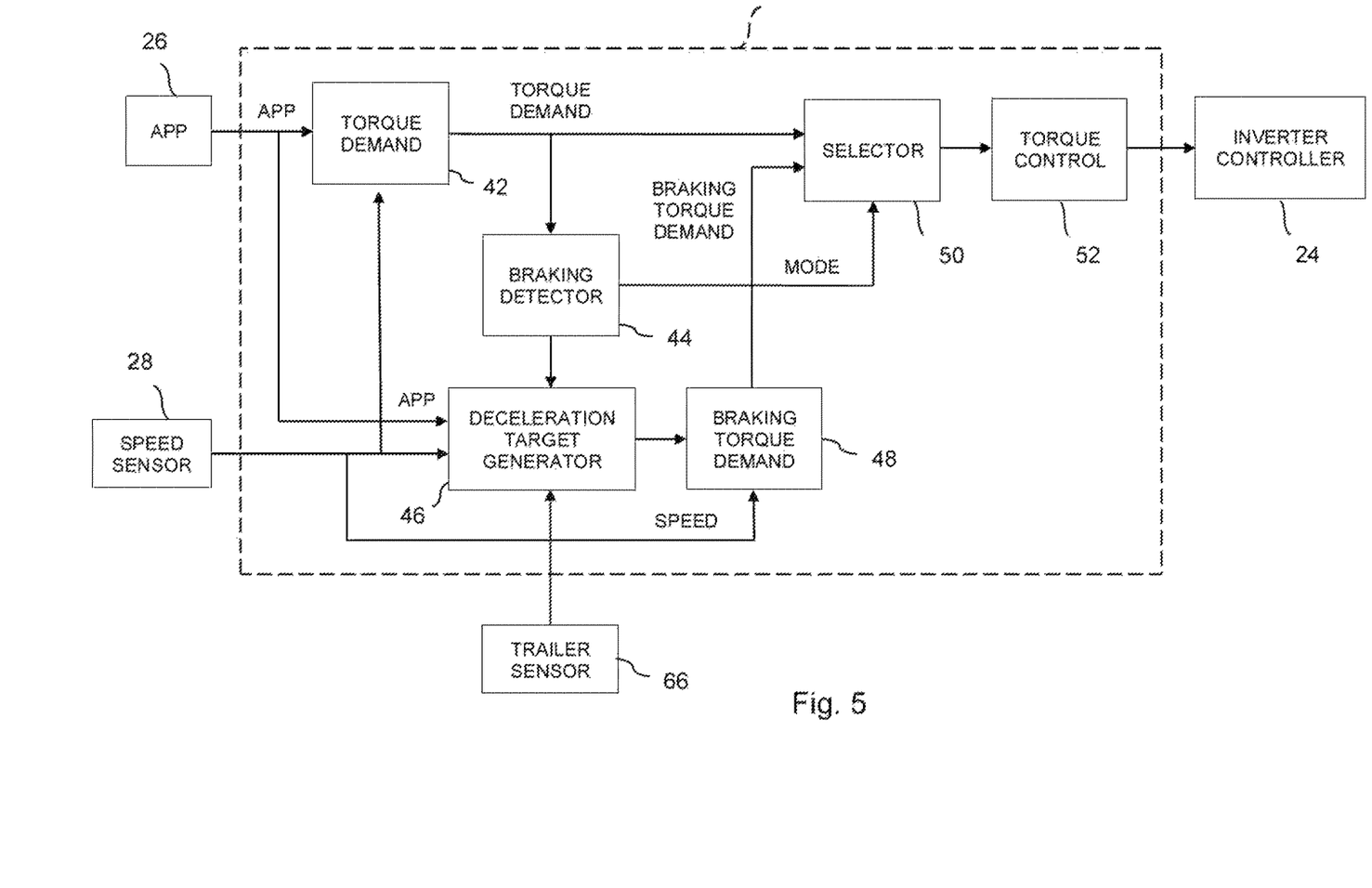
FIG. 5 shows parts of a system control module in another embodiment of the disclosure.

FIG. 5 shows parts of a powertrain system in another embodiment of the disclosure. In this embodiment, the powertrain system is suitable for use with a vehicle, such as a tractor unit, which is designed to haul a trailer. Referring to FIG. 5, the powertrain system comprises system control module 40, inverter controller 24, acceleration pedal position sensor 26 and speed sensor 28 which may be generally in the form described above with reference to FIGS. 1 and 2. In addition, in this embodiment, the powertrain system comprises trailer sensor 66. In operation, the trailer sensor senses whether or not a trailer is connected to the vehicle. This may be achieved, for example, by detecting a physical connection or an electrical connection between the trailer and the vehicle, or by an optical sensor, or by sensing the status of an input device operated by the driver, or in any other way. The trailer sensor 66 outputs a signal indicating whether or not a trailer is present to the deceleration target calculation unit 54 in the system control module 40.

Figure 6:
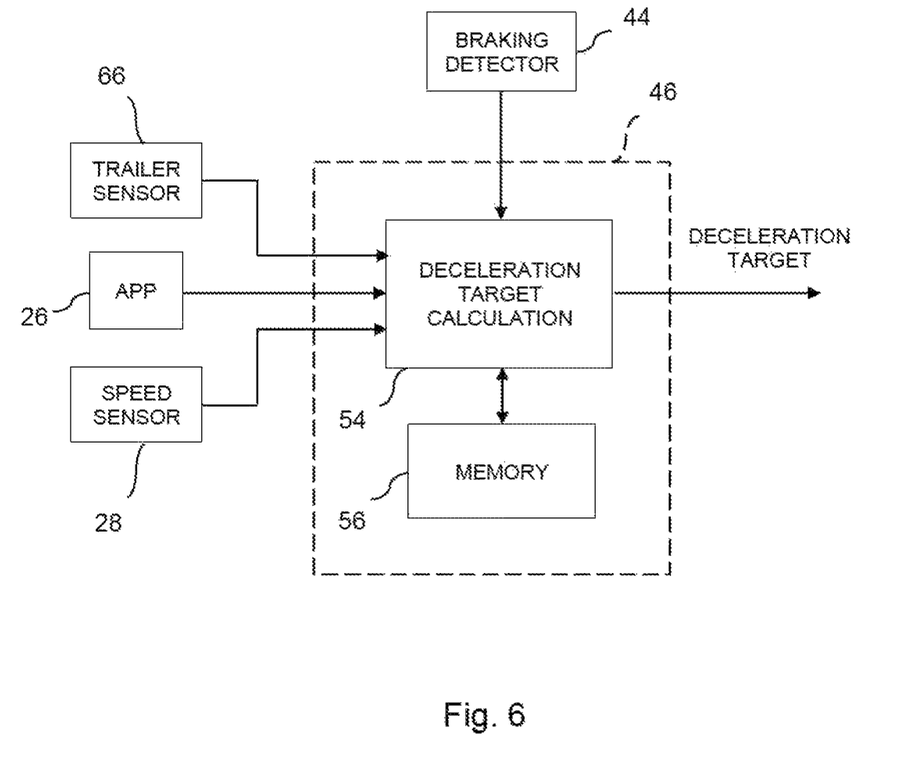
FIG. 6 shows parts of a deceleration target generator in another embodiment of the disclosure.

FIG. 6 shows parts of the deceleration target generator 46 of FIG. 5 in more detail. Referring to FIG. 6, the deceleration target generator 46 comprises deceleration target calculation unit 54 and memory 56. The deceleration target calculation unit 54 receives a mode signal from the braking detector 44, an accelerator pedal position (APP) signal from the acceleration pedal position sensor 26 and a speed signal from the speed sensor 28. In addition, in this embodiment, the deceleration target calculation unit 54 receives a signal indicating whether or not a trailer is present from the trailer sensor 66.

In operation, when the mode signal indicates that the vehicle is in regenerative braking mode, the deceleration target calculation unit 54 uses the accelerator pedal position signal and the speed signal to obtain a deceleration target from a lookup table stored in the memory 56, in a similar way to that described above. However, in this embodiment, the signal indicating whether or not a trailer is present is also used to calculate the deceleration target. In general, when a trailer is present, a higher deceleration target is set than if a trailer is not present. This may be achieved, for example, by using a first lookup table with a first set of values when a trailer is not present, and a second lookup table with a second set of values when a trailer is present. The values in the arrays may be predetermined values which are calculated in advance, or may be modified or updated, for example, to achieve a different performance or based on driver input. Alternatively, it would be possible to use a first function to map accelerator pedal position and speed to deceleration target when a trailer is not present, and a second function when a trailer is present, or a single function for both cases.

In another embodiment, the trailer sensor may also sense the type of trailer which is connected. In this case, the deceleration target calculation unit 54 may calculate the deceleration target based further on the type of trailer which is connected. For example, the deceleration targets may be higher for a large trailer and lower for a small trailer, and may vary in dependence on the size of the trailer.

In further embodiments, one or more other parameters are taken into account as well as accelerator pedal position and speed when calculating the deceleration target. For example, the weight of the trailer, weight of the vehicle, weight of the load, type of load and/or driver preference may be taken into account. In this case, a sensor may be provided to sense the relevant parameter. In general, the memory 56 may store a multi-dimensional array of values mapping a plurality of different inputs to deceleration targets. Alternatively, or in addition, or one or more functions such as polynomial functions could be used to obtain the deceleration target.

Figure 7:
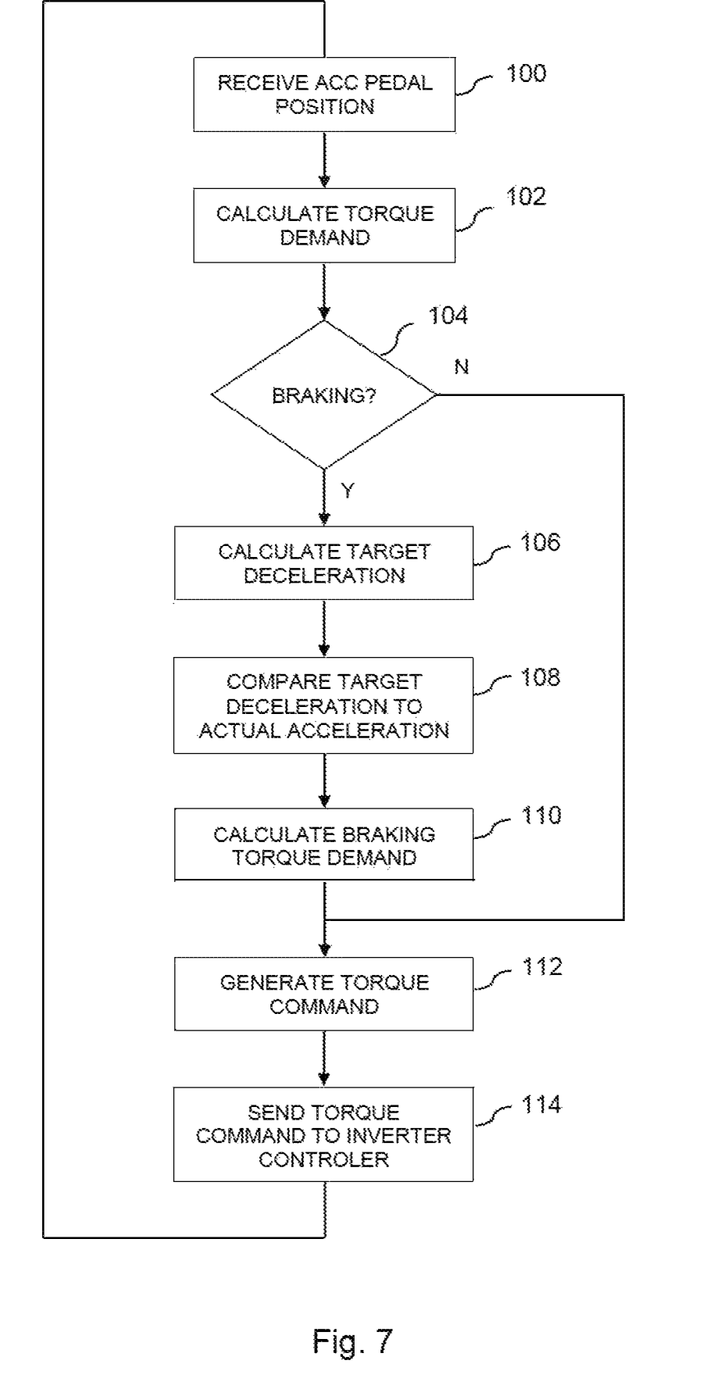
FIG. 7 is a flow chart showing steps carried out by a control module in an embodiment of the disclosure.

FIG. 7 is a flow chart showing steps carried out by a control module (such as the system control module described above) in an embodiment of the disclosure. Referring to FIG. 7, in step 100 an accelerator pedal position signal is received. In step 102 a torque demand is calculated based on the acceleration pedal position. In step 104 it is determined whether the torque demand is negative, indicating that regenerative braking is required. If it is determined that regenerative braking is not required, then processing advances to step 112. If on the other hand it is determined in step 104 that regenerative braking is required (the torque demand is negative) then processing proceeds to step 106.

In step 106 a deceleration target is determined based on the acceleration pedal position signal. This may be achieved, for example, using a formula or a lookup table which maps accelerator pedal position to deceleration target. Generally, the deceleration target will increase progressively as the force on the accelerator pedal decreases. The deceleration target may also be set based on vehicle speed, with a higher deceleration target being set at higher speeds. For example, in one embodiment, a deceleration target of between −0.1 and −1.3 m/s$^2$ may be set, with the value depending on the position of the acceleration pedal as well as the speed of the vehicle, although it will be appreciated that other values could be used instead. If desired, other factors may also be taken into account when determining the deceleration target. For example, the deceleration target may additionally be set based on one or more of whether a trailer is present, type of trailer, weight of trailer, type of load, weight of load, weight of vehicle, driver input and any other appropriate parameter. Processing then proceeds to step 108.

In step 108, the deceleration target is compared to the actual acceleration rate (which is negative if the vehicle is decelerating). The actual acceleration rate may be determined by differentiating a speed signal from a speed sensor with respect to time, or in any other way such as using an accelerometer, camera or radar. The difference between the deceleration target and the actual acceleration is an acceleration error signal. Processing then proceeds to step 110.

In step 110, a braking torque demand is calculated based on the acceleration error signal. This may be achieved, for example, using a formula or a lookup table which maps the accelerator error signal to braking torque demand. Generally, the magnitude of the braking torque demand will increase progressively as the accelerator error signal increases. Processing then proceeds to step 112.

In step 112 a torque command signal is generated based on the torque demand. The torque demand is either that calculated in step 102 if it was determined in step 104 that no regenerative braking is required, or the braking torque demand which was calculated in step 110 if regenerative braking is required. The torque command signal is a command signal which will cause the traction motor to produce the required torque, within system limits. Then in step 114 the torque command signal is sent to the inverter controller. A command signal may also be sent to friction brakes to apply a braking torque, if regenerative braking is insufficient or not available. Processing then returns to step 100.

Exemplary features of the disclosure have been described above with reference to various embodiments. However, it will be appreciated that the disclosure is not limited to these embodiments, and variations in detail may be made within the scope of the appended claims.

What is claimed is:

1. A control system for controlling a powertrain of an electric or hybrid electric vehicle, the powertrain comprising a battery and a traction motor, the powertrain operable in a regenerative braking mode, wherein the control system is configured to:
generate a deceleration target for the vehicle in the regenerative braking mode;
wherein the control system is configured to generate the deceleration target based on an accelerator position signal, a speed signal, and a trailer signal; and
generate a torque command for the traction motor based on the deceleration target.

2. The control system of claim 1, wherein the control system is configured to receive a signal indicating a driver power demand, and to generate the deceleration target based on the signal indicating the driver power demand.

3. The control system of claim 2, wherein the accelerator position signal indicates a driver power demand.

4. The control system of claim 2, wherein the the trailer signal indicates one or more of: whether a trailer is present; type of trailer; weight of trailer; type of load; weight of load; weight of vehicle; and driver input.

5. The control system of claim 1, wherein the control system is configured to compare the deceleration target to a signal indicating an acceleration of the vehicle to produce an acceleration error signal, and to generate the torque command based on the acceleration error signal.

6. The control system of claim 5, wherein the speed signal indicates the speed of the vehicle; and
wherein the control system is configured to differentiate the speed signal to obtain the signal indicating an acceleration of the vehicle.

7. The control system of claim 5, wherein the control system is configured to generate a braking torque demand signal based on the acceleration error signal, and to generate the torque command based on the braking torque demand signal.

8. The control system of claim 1, wherein the control system is configured to control the torque of the traction motor using open loop torque control.

9. The control system of claim 1, wherein the control system is configured to determine whether regenerative braking is required, and to operate the powertrain in the regenerative braking mode if it is determined that regenerative braking is required.

10. The control system of claim 9, wherein the control system is configured to:
receive a signal indicating a driver power demand;
generate a torque demand signal in response to the signal indicating the driver power demand; and
determine whether regenerative braking is required in dependence on the torque demand signal.

11. The control system of claim 10, wherein the control system is configured to generate the torque command based on the torque demand signal when the powertrain is not in regenerative braking mode.

12. A powertrain system for an electric or hybrid electric vehicle, the powertrain system comprising a battery, a traction motor and a control system, wherein the powertrain system is operable in a regenerative braking mode, and wherein the control system is configured to:
generate a deceleration target for the vehicle when in the regenerative braking mode;
wherein the control system is configured to generate the deceleration target based on an accelerator position signal, a speed signal, and a trailer signal; and
generate a torque command for the traction motor based on the deceleration target.

13. The powertrain system of claim 12, further comprising a traction motor controller configured to control the traction motor based on the torque command.

14. The powertrain system of claim 12, wherein, when in the regenerative braking mode, the torque command causes the traction motor to apply a braking torque to meet the deceleration target.

15. The powertrain system of claim 12, further comprising an accelerator position sensor configured to sense a position of a vehicle accelerator, wherein the accelerator position signal comprises the position of the vehicle accelerator.

16. The powertrain system of claim 12, further comprising a speed sensor configured to sense a speed of the vehicle, wherein the speed signal comprises the speed of the vehicle.

17. The powertrain system of claim 16, wherein the control system is configured to:
differentiate the speed signal to obtain a signal indicating an acceleration of the vehicle;
compare the deceleration target to the signal indicating an acceleration of the vehicle to produce an acceleration error signal; and
generate the torque command based on the acceleration error signal.

18. The powertrain system of claim 12, wherein the trailer signal indicates one or more of: whether a trailer is present; type of trailer; weight of trailer; type of load; weight of load; weight of vehicle; and driver input.

19. A method of controlling a powertrain of an electric or hybrid electric vehicle, the powertrain comprising a battery and a traction motor, the method comprising:
operating the powertrain in a regenerative braking mode;
generating a deceleration target for the vehicle in the regenerative braking mode;
wherein the control system is configured to generate the deceleration target based on an accelerator position signal, a speed signal, and a trailer signal; and
generating a torque command for the traction motor based on the deceleration target.

20. The method of claim 19, further comprising:
sensing a position of an accelerator from the accelerator position signal;
generating a torque demand value in response to the sensed accelerator position;
determining whether the torque demand value indicates that regenerative braking is required;
operating the powertrain in the regenerative braking mode when it is determined that regenerative braking is required; and generating a torque command for the traction motor based on the torque demand value when it is determined that regenerative braking is not required.

* * * * *